United States Patent [19]

Mees et al.

[11] 3,892,115
[45] July 1, 1975

[54] METHOD AND MACHINE FOR FORMING LAMINATIONS FOR USE IN SELF LOCKING CORES

[75] Inventors: Robert D. Mees; Armin F. Mittermaier, both of Fort Wayne; Albert F. Wilcox, Yoder, all of Ind.

[73] Assignee: Construction Materials Division, General Electric Company, Indianapolis, Ind.

[22] Filed: Mar. 20, 1974

[21] Appl. No.: 452,960

Related U.S. Application Data

[62] Division of Ser. No. 378,999, July 13, 1973, Pat. No. 3,850,468.

[52] U.S. Cl............... 72/294; 29/203 L; 29/609; 72/334; 72/338
[51] Int. Cl............................................. B21d 43/28
[58] Field of Search...... 29/606, 609, 203 R, 203 L, 29/203 D; 72/294, 307, 334, 338

[56] References Cited
UNITED STATES PATENTS

| | | | |
|---|---|---|---|
| 2,931,993 | 4/1960 | Dornbush | 29/609 X |
| 3,008,222 | 11/1961 | Steinmayer | 29/609 X |
| 3,327,373 | 6/1967 | Somerville | 29/606 X |
| 3,513,523 | 5/1970 | Mittermaier et al. | 29/609 X |

*Primary Examiner*—Carl E. Hall

[57] ABSTRACT

A machine for forming a core of laminations from a strip of material includes a forming section for forming the strip into a generally rectangular configuration and severing the formed section from the strip. A first gripper advances the strip to the forming station for formation of a first pair of sides of the lamination and a second gripper advances the strip to the forming station for formation of a second pair of sides of the lamination. A first stop interrupts the strip advancing motion of the first gripper and a second stop interrupts the strip advancing motion of the second gripper. An auxiliary stop cooperates with the first gripper for providing strip advancing motion of the first gripper less than that allowed by the first stop so that one of the first pair of lamination sides is provided with two discontinuous portions. An extractor removes a formed lamination from the forming station and a separator opens formed lamination at its discontinuity. An inserter thereafter inserts the formed lamination about a preformed coil of electrical conductor and recloser engages the lamination to reclose it after the insertion.

7 Claims, 19 Drawing Figures

METHOD AND MACHINE FOR FORMING LAMINATIONS FOR USE IN SELF LOCKING CORES

This is a division, of application Ser. No. 378,999 filed July 13, 1973.

BACKGROUND OF THE INVENTION

This invention relates to machines and methods for forming laminations for magnetic cores. More particularly, in one form, it relates to an improvement in machines and methods for forming laminations and cores made from the laminations, in which each layer of the core is formed from one lamination having only one discontinuity.

It is highly desirable that the various lamination layers and cores for electromagnetic apparatus have as few discontinuities as possible in order to enhance the electromagnetic characteristics on the core. A highly desirable core configuration is one in which each layer of the core, that is each layer of lamination material, is formed from a single lamination which extends substantially completely around the associated coil and has no more than one discontinuity or cut interrupting its flux path. It is possible to make such cores with a substantially manual method however this is very time consuming and thus very expensive and impracticable from a commercial standpoint. A well received commercial approach to a machine and method for providing good cores are shown and described in U.S. Pat. No. 3,513,523, which is assigned to General Electric Co., assignee of the present invention.

As set forth in that patent a machine and method are provided which form a number of inter-related L-shaped lamination pieces which then are placed together with a very tight fit. Such a machine and method greatly enhance the manufacture of laminations and assembly of cores in a commercial situation. However, each layer of laminations still has two discontinuities as the core is formed from two sets of L-shaped laminations.

It is accordingly an object of the present invention to provide an improved method and machine for forming laminations for magnetic cores for use in an electromagnetic apparatus.

It is another object of the invention to provide an improved machine and method of providing laminations for cores for use in electromagnetic induction apparatus in which the individual layers of the core are formed of single laminations.

A more specific object of the present invention is to provide a machine and method for making generally rectangular laminations sequentially formed from an elongated strip of magnetic material in which each lamination has only a single discontinuity.

SUMMARY OF THE INVENTION

In accordance with one form of the invention there is provided a machine for making laminations for a core from a strip of magnetic material. The machine includes a forming station for forming a section of the strip of material into a generally rectangular configuration and severing the formed section from the strip. Gripper means advance the strip of material to the forming station and normal stop means interrupt the strip advancing motion of the gripper means for formation of first and second pairs of opposed sides of the lamination. Auxiliary stop means cooperate with the gripper means for providing strip advancing motion of the gripper different than that allowed by the normal stop means so that one side of the lamination is provided with two discontinuous portions.

In accordance with one form of the method of the present invention there is provided a method of making laminations of a generally rectangular configuration from an elongated strip of material. The method includes the steps of advancing the strip the length of a first portion of one leg of the lamination and forming a right angle bend in the strip; successively advancing the strip the lengths of second, third and fourth legs of the lamination respectfully and forming right angle bends in the strip after each advancement; and advancing the strip the length of a second portion of the first leg of the lamination and severing the formed lamination from the strip.

The subject matter which we regard as our invention is set forth in the appended claims. the invention itself, however, together with further objects and advantages thereof may be better understood by reference to the following description taken in conjunction with the accompanying drawings in which:

BRIEF DESCRIPTION OF THE DRAWINGS

FIG. 19 is a fragmentary view of one corner of a core constructed from laminations formed in accordance with the machine and method of the present application.

DESCRIPTION OF THE PREFERRED EMBODIMENTS

Figure 1:
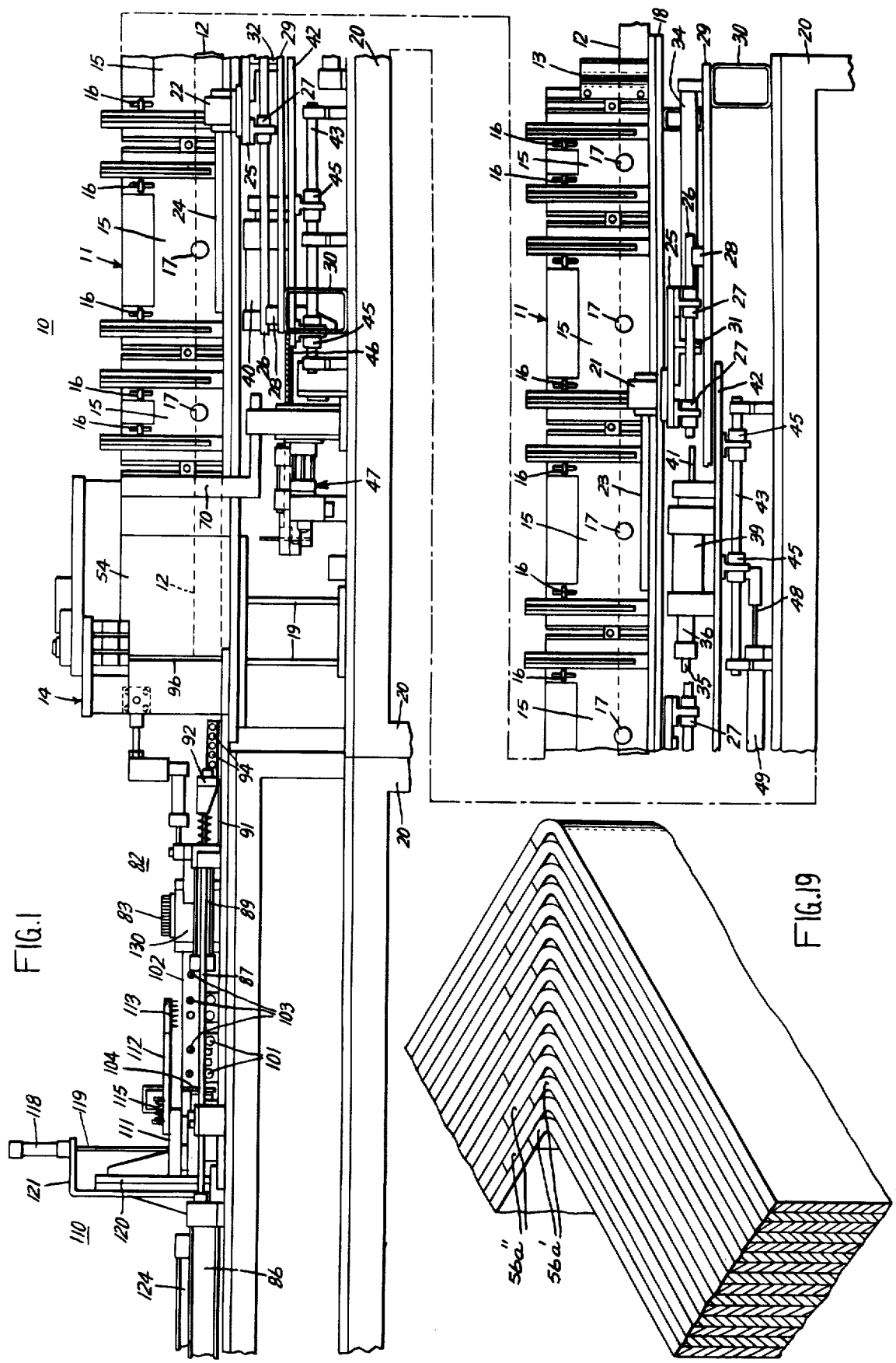
FIG. 1 is a somewhat simplified side elevational view of a machine incorporating one form of the present invention.

Referring now to the drawings and particularly to FIG. 1 there is illustrated, in somewhat simplified form, a machine for forming individual, generally rectangular laminations from a strip of material and inserting the formed laminations about a preformed coil of electric conductor to form a core for an electromagnetic apparatus.

The machine 10 includes a guide structure 11 to receive and guide an elongated strip 12 of suitable electromagnetic material such as steel. The strip 12 enters the guide structure 11 at the right hand end, as shown in the drawings, through a pair of flared input guides 13 and emerges from the left hand end in alignment with the forming and severing apparatus indicated at 14. The guide structure 11 conventionally may include an elongated back support plate or plates bolted together to form a unitary structure and a number of front plates, such as those shown at 15, which are held in place by latch arrangements 16 and have handles 17 for removal for easy access to the strip of material when it is in the machine. The guide structure is supported from a table 18 which, in turn, is supported as by braces 19 from a bench structure 20.

In order to repeatedly advance predetermined lengths of a strip 12 to the forming and severing apparatus 14 there are included first and second grippers generally indicated at 21 and 22 respectively. The guide structure 11 is provided with cooperating slots 23 and 24 so that the grippers, when actuated, may firmly engage the strip 12 and move it along the guide structure. Each of the grippers is mounted to a platform 25 and each of the platforms 25 is slidably mounted on a pair of spaced apart guides or rods, one of which is shown at 26, by means of sliding bushings 27. The rods or guides 26 are supported by brackets 28 from a sub-table 29. The sub-table, in turn, is supported from the bench structure 20 by means of braces 30.

Operating tabs 31 and 32 extend downwardly from the platforms 25 for grippers 21 and 22 respectively. Piston 33 of a double-acting hydraulic or pneumatic actuator 34 is connected to the tab 31 and the piston 35 of a double-acting hydraulic actuator 36 is connected to the tab 32. When either of the hydraulic actuators 34 and 36 is energized the corresponding gripper 21 and 22 will be moved along the rails 26. The grippers 21 and 22 each may be hydraulically actuated as indicated by cylinders 37 and 38 respectively. (See FIG. 3 for instance.) Assuming the appropriate actuator 37 and 38 is energized, energization of the corresponding actuator 34 and 36 will cause that gripper mechanism to advance the strip 12. Movement of the grippers 21 and 22 is interrupted by shock absorbing stop mechanisms generally indicated at 39 and 40 respectively. Each of the mechanisms 39 and 40 includes a piston as illustrated at 41 which engages the corresponding one of the tabs 31 and 32. Both of the stop mechanisms 39 and 40 are mounted to a support platform 42. The platform 42 is supported on two sets of spaced apart guides shown at 43 and 44 by bushings 45. The guides 43 and 44 are mounted to the bench structure 20.

The platform 42 also is attached to a drive screw 46. The drive screw 46 is a part of a thickness gauging and adjustment mechanism generally indicated at 47. The thickness gauging and adjusting mechanism operates through the drive screw 46 to move the platform 42 and thus the stop mechanisms 39 and 40 so as to vary the length of the stroke of grippers 21 and 22. The piston 48 of a hydraulic actuator 49 is connected to the platform 42 to return the platform, and thus the stop mechanism, to their original positions at the end of each complete sequence of operation.

Figure 2:
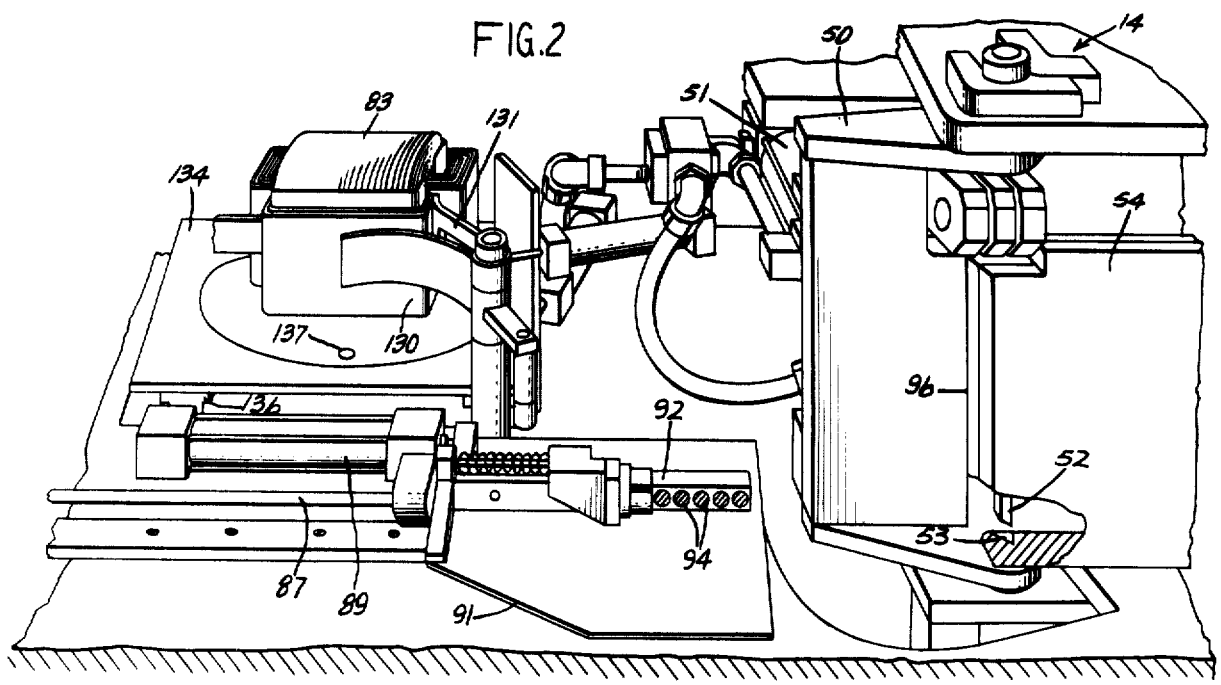
FIG. 2 is a perspective view of a portion of the machine of FIG. 1 showing additional details of the lamination forming mechanism and the core stacking mechanism.

Referring now to FIG. 2, the forming and severing apparatus includes a forming head 50 which is operated by a double-acting hydraulic actuator 51. The apparatus also includes a cutting knife 52, which also may be hydraulically actuated, and is received in a mating recess 53 in front guide plate 54 when it severs the strip. The forming and severing apparatus also includes a gripper 55 which is schematically illustrated in FIGS. 8-12 holding the strip as it is bent and severed. The general mode of operation of a forming and severing apparatus substantially like that shown is described in the afore-mentioned U.S. Pat. No. 3,513,523.

Figure 8:
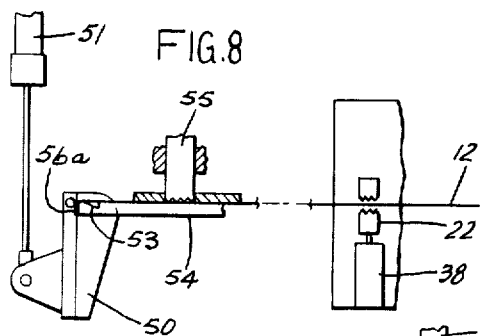
FIG. 8 is a schematic representation of the lamination forming and severing mechanism, with the mechanism in a first of its positions.
Figure 9:
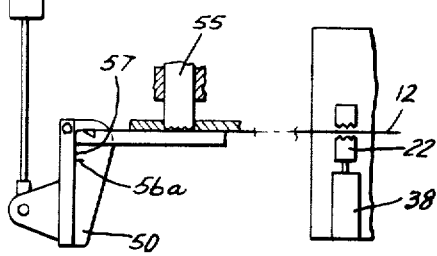
FIG. 9 is a schematic representation similar to FIG. 8 showing the apparatus in yet another position.

FIGS. 8-12 inclusive, show the operation of the forming head 50, cutting knife 52 and gripper 55 to form a generally rectangular lamination. Assuming that the gripper mechanisms 21 and 22 advance appropriate sections of the strip 12, the forming head 50 first bends over a very short section of the strip to form a first portion 56a of a first leg 56 of the lamination, as shown in FIG. 8. As shown in FIG. 9, the forming head next bends or folds over another section of the strip to substantially a right angle to form a second leg 57.

Figure 10:
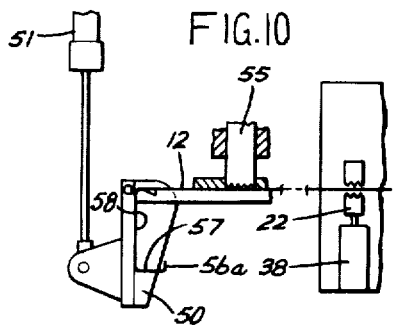
FIG. 10 is a schematic representation similar to FIG. 8 but showing the apparatus in yet another position.
Figure 11:
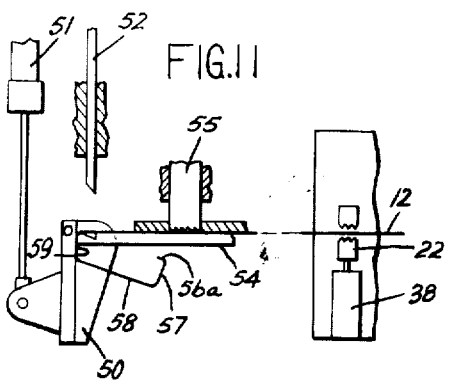
FIG. 11 is a schematic representation similar to FIG. 8 showing the apparatus in still another of its positions.
Figure 12:
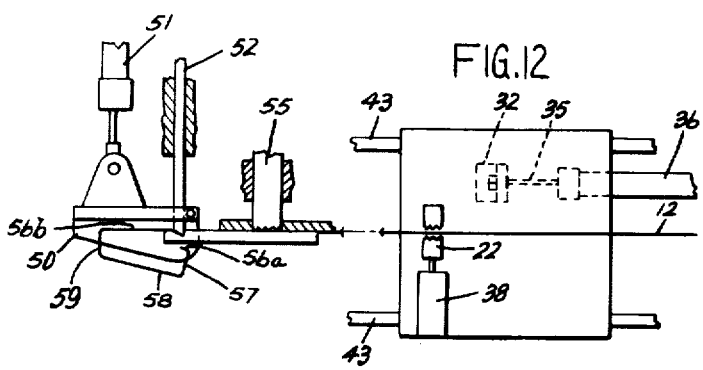
FIG. 12 is a schematic representation similar to FIG. 8 showing the apparatus in still another of its positions.

The forming head next bends over to substantially a right angle over a longer section of the strip to form a third leg 58, as shown in FIG. 10. The forming head then bends over at substantially a right angle another section to form the fourth leg 59, which is equal in length to second leg 57, as shown in FIG. 11. Lastly, the knife 52 is operated and cooperates with the recess 53 to sever the strip to form a second portion 56b of the first leg 56, as shown in FIG. 12. Each time the forming head 50 or knife 52 is actuated to either bend the strip or sever the strip, the gripper 55 securely holds the strip against front plate 54 to prevent movement at the strip. This enables the grippers 21 or 22 to be retracted at the same time the strip is being formed and severed. In the illustrative embodiment a lamination is formed having two pairs of opposed legs. The first pair is composed of first and third legs 56 and 58 while the second pair is composed of second and fourth legs 57 and 59. Also in the exemplification the leg portions 56a and 56b combined form leg 56, which is equal in length to the length of leg 58.

The grippers 21 and 22 are utilized to advance the strip 12 in such a manner as to provide the proper length of material to the forming and severing mechanism for each portion of each lamination. In accordance with one aspect of the present invention the movement of the grippers 21 and 22 is adjusted in such a manner that each subsequently formed lamination in any series of laminations to be used in the same core will be longer and wider than the last previously formed lamination by a dimension which is equal to twice the thickness of the section of the strip 12 used in the last previously formed lamination.

Figure 3:
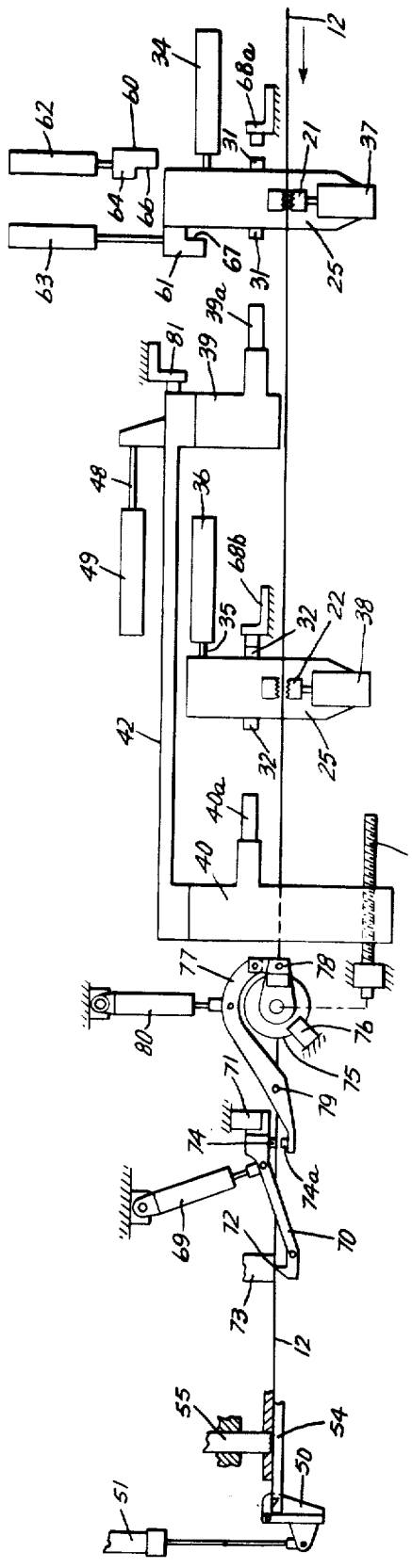
FIG. 3 is a schematic representation of the strip advancing mechanism of the machine of FIG. 1 with the mechanism shown in a first position.
Figure 7:
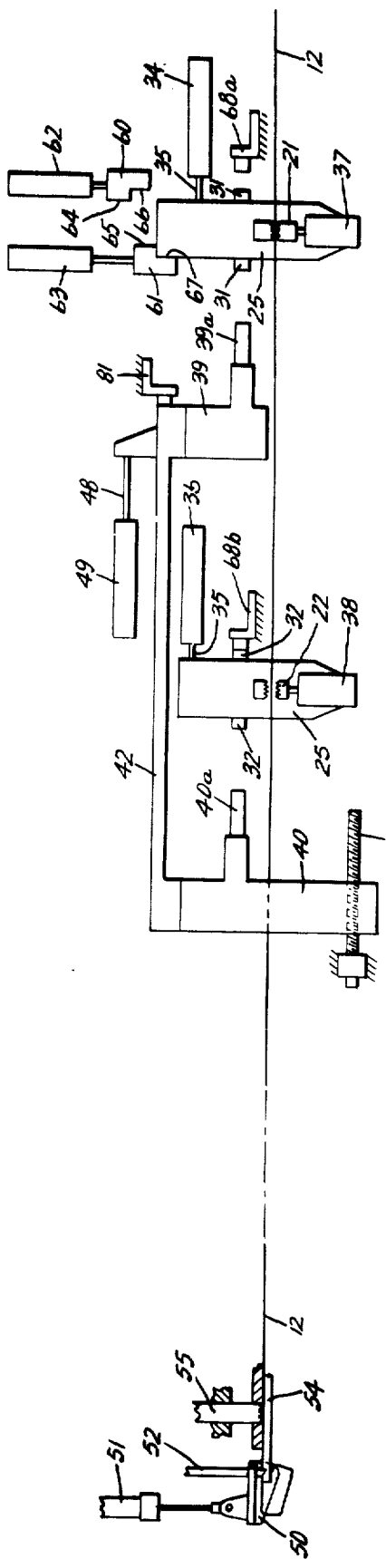
FIG. 7 is a schematic representation similar to FIG. 3 but with the mechanism in a fifth position.

Referring now to FIGS. 3–7 inclusive there is shown, in schematic form, the overall strip advancing mechanism. In addition to the shock absorbing stops 39 and 40, the machine 10 includes a pair of auxiliary stops 60 and 61 which cooperate with the first gripper 21 to provide the first and second portions 56a and 56b of the first lamination leg 56. Each of the auxiliary stops 60 and 61 is moveable by a suitable means, such as hydraulic actuators 62 and 63 respectively, so as selectively to be brought into the path of the platform 25 for gripper 21. Each of the stops 60 and 61 has a long section, 64 and 65 respectively, and a short section, 66 and 67 respectively. Additionally, there is provided a stationary stop 68a for gripper 21 and a stationary stop 68b for gripper 22. A series of operations of the grippers 21 and 22 to sequentially advance sections of the strip 12 to form one lamination begins with both of the grippers fully retracted, that is with tabs 31 and 32 engaging stationary stop 68a and 68b respectively. The stop 61 is moved by actuator 63 so that one of its lengths 65 or 67 is positioned to interfere with the motion of platform 25 for gripper 21. If it is desired that the first portion of the first leg of the lamination be very short, the stop 61 is extended as illustrated in FIG. 3 so that its longer portion will interrupt the strip advancing motion of stripper 21. Actuator 37 is energized to close gripper 21 and actuator 38 is energized to open gripper 22. Actuator 34 then is energized to move gripper 21 to the position shown in FIG. 3. Gripper 21 carries strip 12 with it until its platform 25 engages the longer surface 65 of stop 61.

Gripper 55 associated with the forming and severing mechanism then engages the strip and holds it in place during the forming operation. This also allows the gripper 21 to release the strip and return to the right (as seen in the FIGS. 3–7). Auxiliary stop 61 then is retracted.

Figure 4:
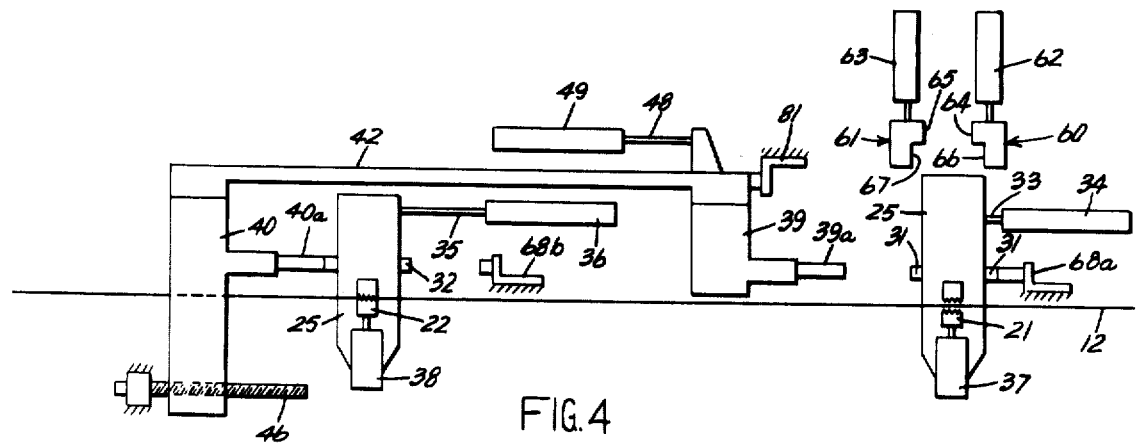
FIG. 4 is a schematic representation similar to FIG. 3 but with the mechanism in a second position.

Next gripper 22 is tightened on the strip 12 and is moved by actuator 36 to the left until tab 32 engages piston 40a of shock absorbing stop 40 to advance the strip an amount to form the second leg 57. This position of gripper 22 is shown in FIG. 4. Gripper 55 then is actuated to hold the strip while the forming head 51 forms the leg 57. This allows gripper 22 to be disengaged from the strip and returned to its right hand position in engagement with stationary stop 68b.

Figure 5:
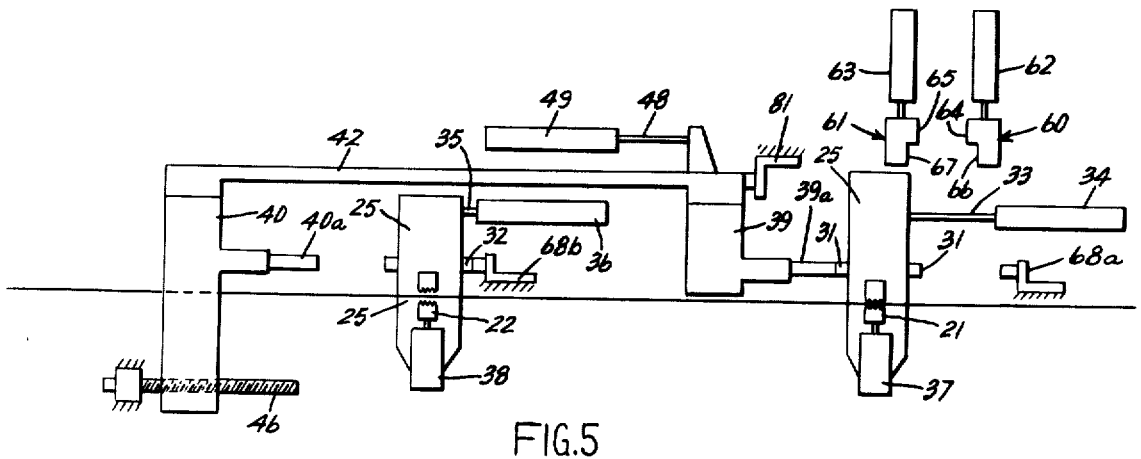
FIG. 5 is a schematic representation similar to FIG. 3 but with the mechanism in a third position.

Next the grippper 21 is actuated to engage the strip 12 and actuator 34 is energized to move gripper 21 until operating tab 31 engages the piston 39a of shock absorbing stop mechanism 39. This strip advancing movement is a full stroke of the gripper 21 and advances the strip a distance equal to the third leg 58 of a lamination. This position for the grippers is shown in FIG. 5.

Next the gripper 55 holds the strip as forming head 50 makes another right angle bend in the strip. Before gripper 21 is retracted stop 60 is moved actuator 62 so that its short surface 66 is in interfering relationship with the platform 25 for gripper 21. When gripper 21 is retracted it stops in the position shown in FIG. 6 that is to the left of stationary stop 68a. This shortens the distance between operating tab 31 and piston 39a so that, upon the next strip advancing movement of gripper 21, a lesser amount of strip material will be advanced.

Figure 6:
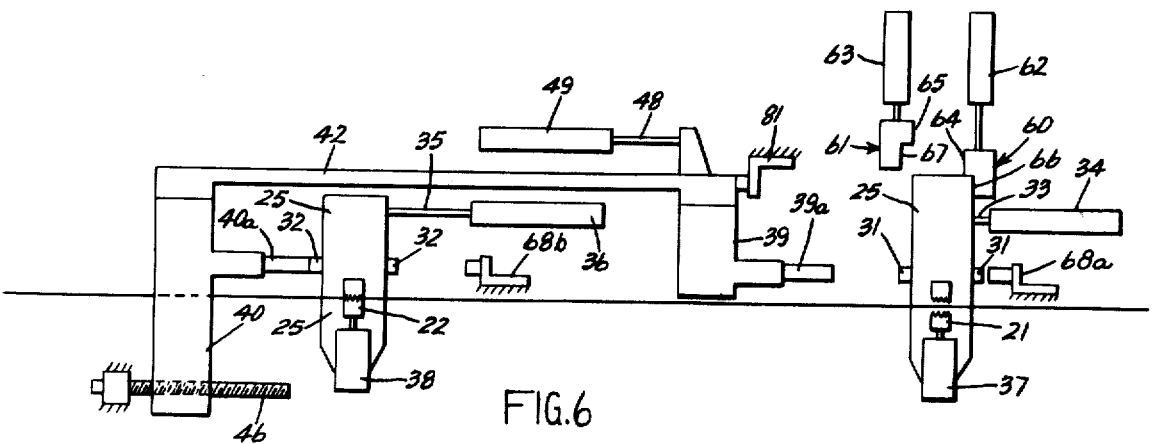
FIG. 6 is a schematic representation similar to FIG. 3 but with the mechanism in a fourth position.

At the same time the gripper 21 is retracted gripper 22 is energized to grip the strip and is again moved to the left into engagement with piston 40a of shock absorbing stop mechanism 40. This forms the fourth leg 59 of a lamination of equal length to the second leg. The positions of the grippers at the end of this movement is shown in FIG. 6.

Gripper 55 now holds the strip stationary while the bending head 50 forms an additional right angle bend in the material. Thereafter gripper 21 is moved from the position shown in FIG. 6 to the position shown in FIG. 5, advancing the strip 12 an amount equal to the second portion 56b of the first leg. Gripper 55 is then actuated to hold the strip while the knife 52 severs the formed lamination from the strip 12. Any one lamination has only one discontinuity that is between the first and second portions of the first leg.

The auxiliary stops 60 and 61 are positioned and sized such that the two leg portions 56a and 56b together form a leg 56 which is equal in length to the third leg 58. The movement of the auxiliary stops 60 and 61 are coordinated so that when the long portion 65 of stop 61 is used in forming the first portion 56a the short segment 66 of the stop 60 is used in forming the second leg portion 56b. Similarily when the short portion 67 of stop 61 is used to form the first leg portion then the long portion 64 of the stop 60 is used in forming the second portion of the first leg. With this arrangement the first leg portion selectively is one of two lengths and the second leg portion is the difference between that and the length of the third leg. In one form of the invention the movement of the stops 60 and 61 are alternated so that the first leg portion alternates between a relatively short and a relatively long length between adjacent laminations in a series of laminations made for use in the same core.

While the gripper 55 holds the strip 12 for severence by the knife 52, the thickness gauge and adjustment mechanism 47 is utilized to set the platform 42 and shock absorbing stop mechanisms 39 and 40 for the next lamination. To this end an actuator 69 pivots arm 70 about its mount 71 until an elongated edge 72 pinches the strip 12 against a stationary blade 73. The thickness of the strip 12 thus controls the final position of the arm 70. The arm 70 carries a flat gauging surface 74 and, therefore, the thickness of the strip 12 determines the position of the surface 74. The drive screw 46 carries a disc 75 at its end remote from its engagement with the stop mechanism 40. A brake 76 spans the disc 75 and a crank arm 77 is selectively attachable to the disc 75 by attachment pads, one of which is shown at 78. The arm 77 is pivoted at 79 and is movable by an actuator 80. The end of the arm 79 includes a surface 74a in alignment with the surface 74. Normally the brake 76 is actuated and positively holds the disc 74 and the drive screw 46 against rotation. When it is desired to set the mechanism for a subsequent lamination the brake 76 is released and the attachment pads 78 are energized to engage the disc 75. The actuator 80 then pivots the arm 77 about its mount 79 until the surface 74a engages the surface 74. This rotates the disc 75 and drive screw 46. The proportions of the various parts of the mechanism 47 are such that the rotation of the disc 75 and screw 46 is sufficient that it moves the platform 42 and the shock absorbing stop mechanism 39 and 40 to the left, as seen in FIGS. 3–7, an amount equal to twice the thickness between edge 72 and block 73. Thus the pistons 39a and 40a are moved further away from the operating tabs 31 and 32 by a distance equal to twice the thickness of the strip 12 of material. The next formed lamination therefore will have an inside length and width substantially twice the thickness of the material greater than the last previously formed lamination. The piston 48 and actuator 49 are connected to the platform 42 and are actuated after the last of a series of laminations are formed in order to return the platform 42 and the stops 39 and 40 to their original positions. The stationary stop 81 engages platform 42 to determine the original positions of these elements.

A thickness gauging mechanism generally similar to that incorporated in the thickness gauge and adjustment mechanism 47 of the present machine is shown and described in the aforementioned U.S. Pat. No. 3,513,523.

Referring now to FIG. 19 there is illustrated one corner of a core section utilizing laminations produced with the machine and method just described. Alternate laminations include a first leg portion 56', which are relatively short, while the first leg portions 56a of the other alternate laminations are relatively long. As also is illustrated in FIG. 19 the measurement of the thickness of the laminations and the attendant provision of the next lamination having a length and a width longer by essentially twice the thickness of the material results in each of the laminations nesting tightly about the one inside it. The 90° angles formed by the forming head 50 result in the inside radius of the bends in each lamination being smaller than the outside radius of the bends in the previous lamination so that no inadvertent engagement occurs in the corner sections. This enables the designer to determine exactly where there will be layer-to-layer contact between laminations for better design of electromagnetic apparatus such as transformers.

Figure 13:
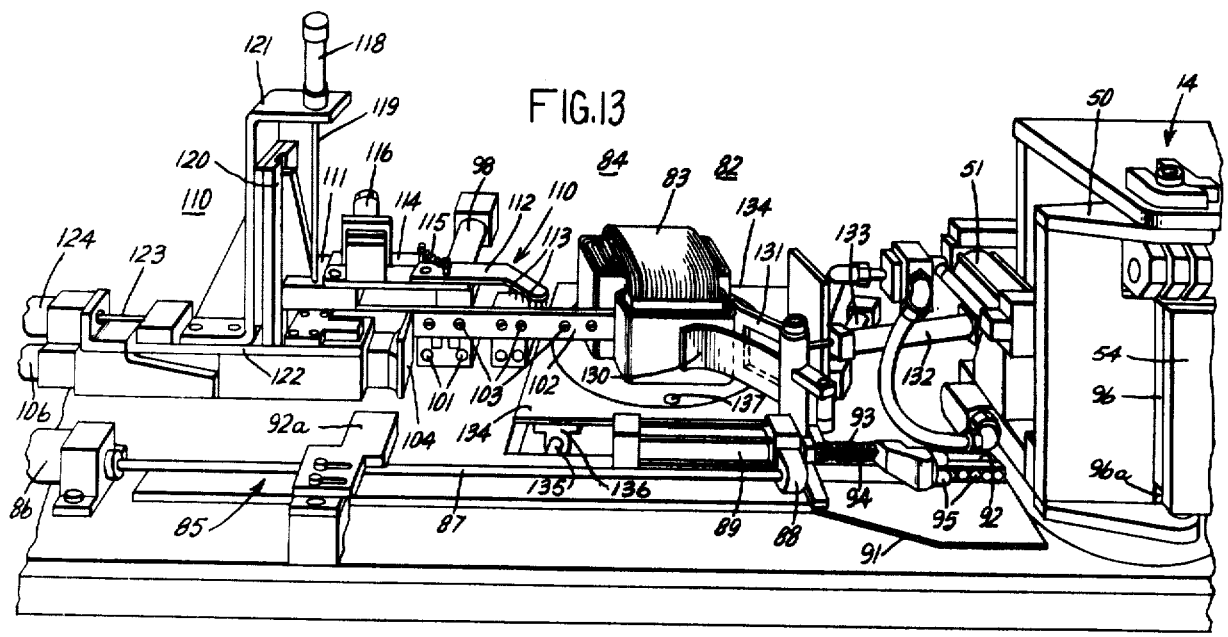
FIG. 13 is a perspective view similar to FIG. 2 but showing additional details of the core forming apparatus of the machine of FIG. 1.
Figure 14:
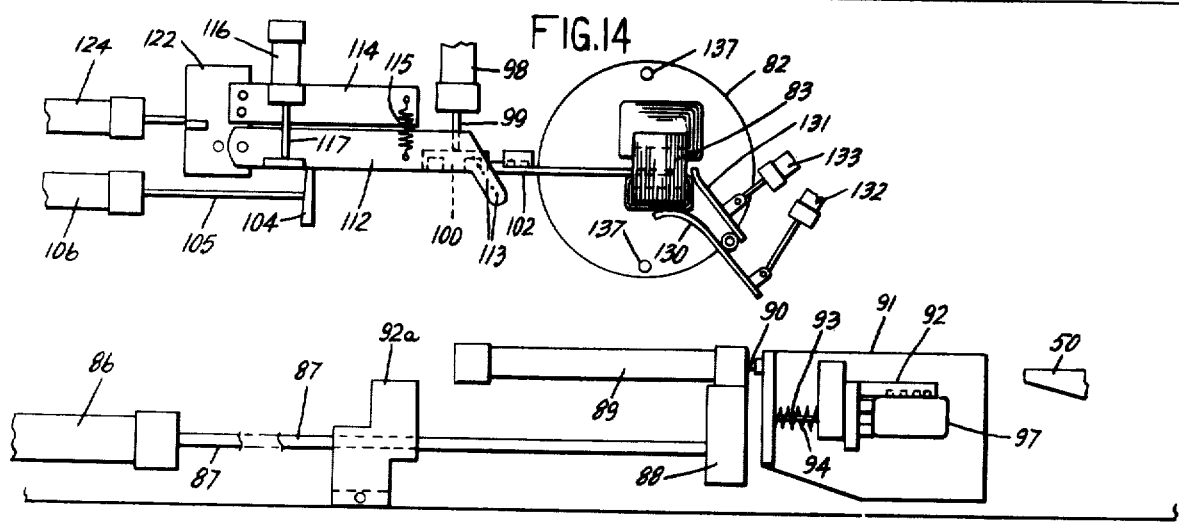
FIG. 14 is a schematic representation of the core forming apparatus of FIGS. 1 and 13 shown in one of its positions.

With the exemplification machine of the present invention each lamination, when it has been formed, is removed from the forming station and moved to a core assembly or stacking station generally indicated as 82 in FIG. 13. At the core stacking station individual laminations are inserted about a preformed coil of electrical conductor such as that shown at 83 to form a core for the coil. To this end the machine 10 includes an apparatus generally indicated at 84 for removing laminations from the forming station, placing them in alignment with a coil 83, opening the laminations, inserting them about the coil and then assuring their reclosing.

Referring now to FIGS. 13–18 inclusively, an extractor 85 has a primary or long stroke hydraulic actuator 86 with a piston 87. The piston 87 carries a head 88 to which is mounted a short stroke hydraulic actuator 89. The piston 90 of actuator 89 carries a plate 91. An L-shaped extraction head 92 is connected to the plate 91 by shaft 93 and is biased by spring 94 to its forward position (to the right as seen in the Figures). A number of small permanent magnets 95 are embedded in the extraction head.

The long stroke hydraulic actuator 86 is energized to extend its piston so that the extractor assumes the position shown in FIG. 13, that is with the extraction head just short of the forming head 50. Thereafter the short stroke actuator 89 is energized and extend its piston 90 so that the extraction head is moved to the right to contact a just formed lamination and the extending portion of the head 92 will enter a recess 96a in the back guide plate 96. Head 92 may slide along the rod or shaft 93 which enables the short stroke actuator 89 to be used in order to pick up laminations of various sizes. The stroke of piston 90 is long enough to make contact with the shortest laminations and the head 92 is free to move along shaft 93 sufficiently to accommodate the largest lamination.

Thereafter the short stroke hydraulic actuator is energized in a reverse configuration to withdraw its piston 90. This brings the extractor to the position shown in FIG. 14, with a lamination 97 held by the extraction head 92. The long stroke actuator 86 then is energized to retract its piston 87. This action brings the plate 91 to the position shown in FIG. 15. In moving from the position shown in FIG. 14 to the position shown in FIG. 15 the extraction head 92 moves under a stationary block 92a which is set to engage the lamination 97 and remove the lamination from the extraction head 92.

Both a long stroke actuator 86 and a short actuator 89 are utilized in the extractor in order to gain cycle time. It will be understood that a lamination can be moved from the forming station to the stacking station and inserted about a preformed coil in less time than it takes to form the next lamination. By using both of the actuators 86 and 89 the next forming operation may begin as soon as actuator 89 has retracted and thus the forming operation will commence while the actuator 86 is in operation. It will be understood that a single actuator could be utilized if desired.

Figure 15:
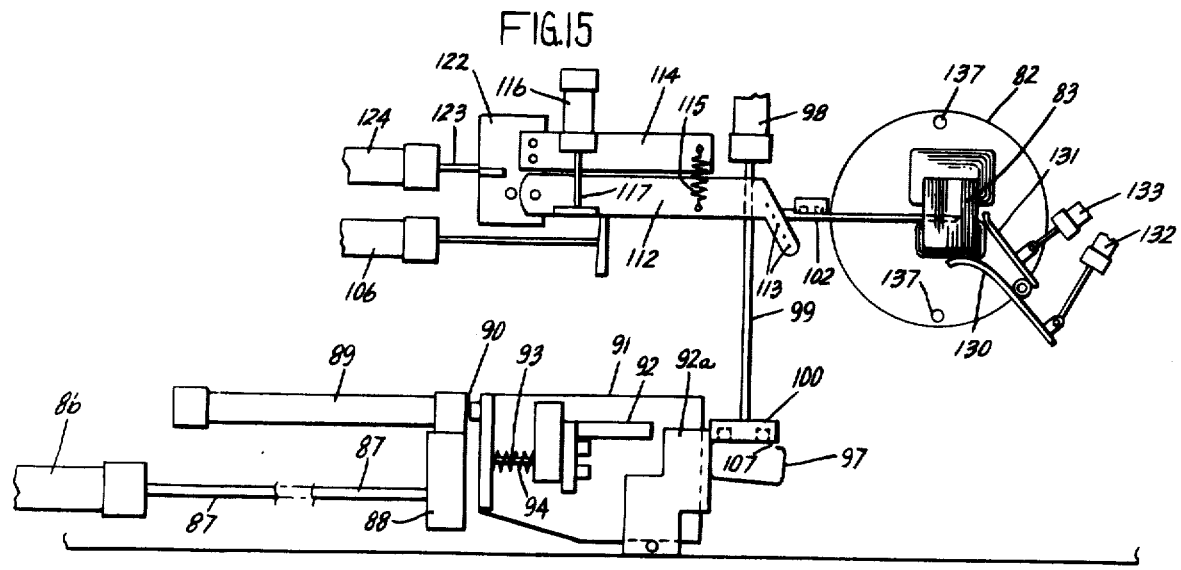
FIG. 15 is a schematic representation similar to FIG. 14 showing the apparatus in another position.
Figure 16:
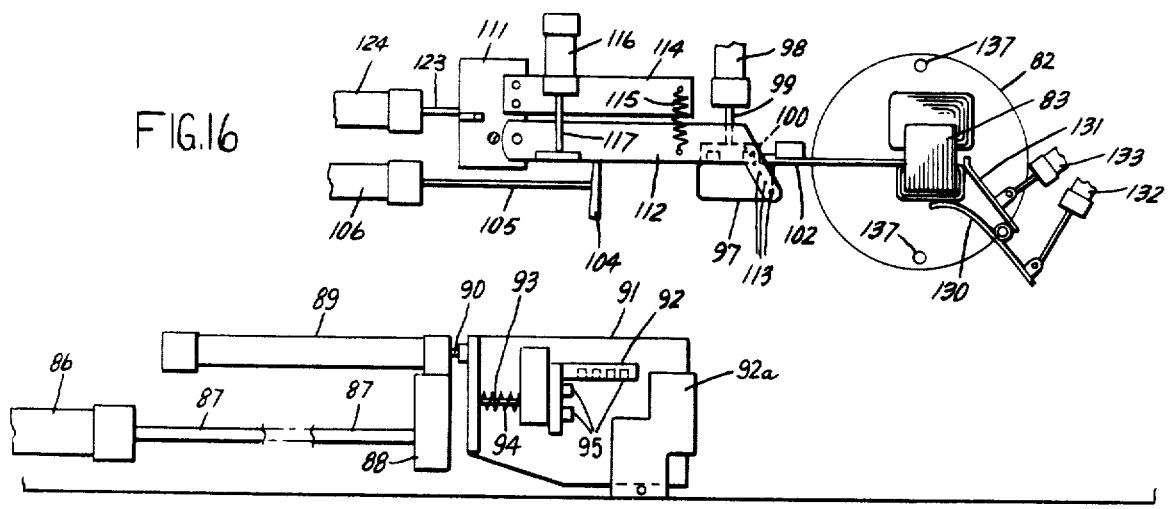
FIG. 16 is a schematic representation similar to FIG. 14 showing the apparatus in still another of its positions.
Figure 17:
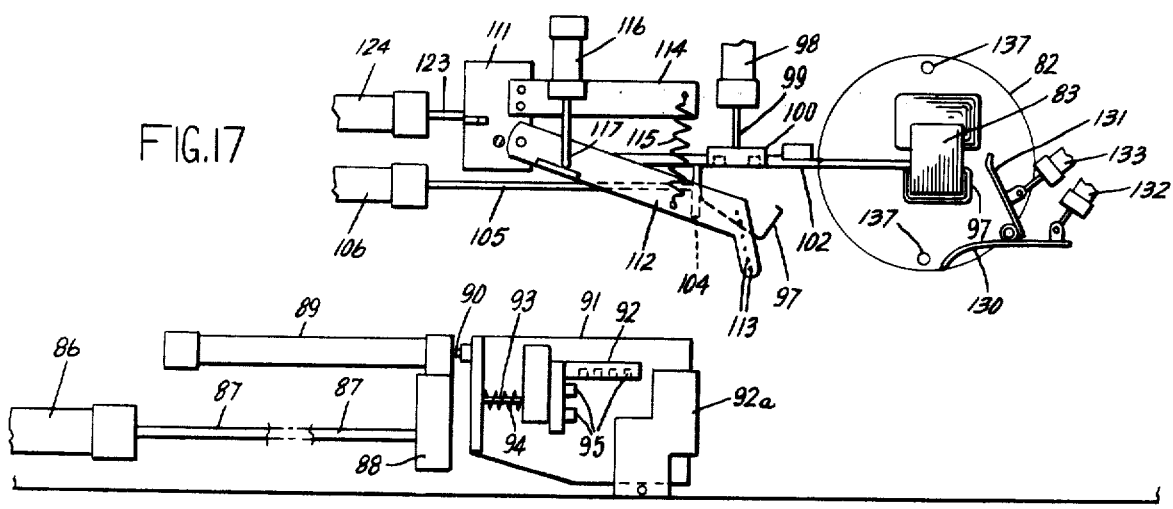
FIG. 17 is a schematic representation similar to FIG. 14 showing the apparatus in yet another position.
Figure 18:
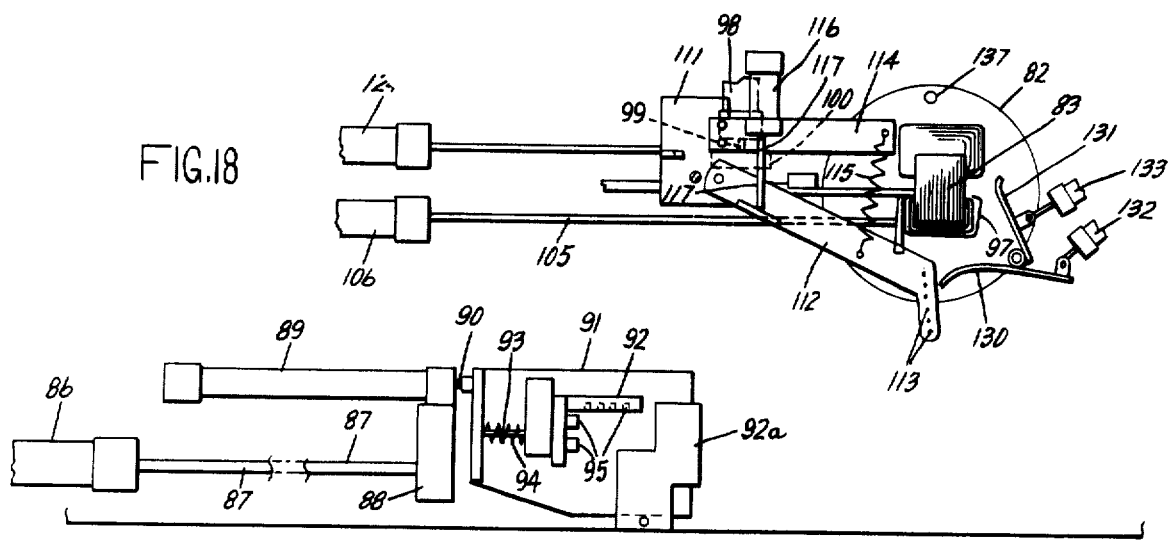
FIG. 18 is a schematic representation similar to FIG. 14 showing the apparatus in still another of its positions.

The core stacking station 82 is removed from the lamination forming station and a positioner, in the form of actuator 98 and piston 99 carrying a position head 100, is used to move laminations 97 into alignment with the coil 83. The extended position of the positioner is shown in FIG. 15 while its retracted position is shown in FIG. 16. The head 100 also is provided with embedded magnets such as those shown at 101 which bring the laminations across and into engagement with an elongated guide 102. The guide 102 has a number of magnets 103 spaced along its length and extends into the preformed coil 83. Thus, a lamination pushed along the guide 102 will adhere to the surface of the guide so as to be brought into alignment with the coil 83. This motion is provided by pusher 104 which is connected to a piston 105 operated by a double acting actuator 106. The stroke of the piston 105 is sufficient to push each lamination fully into its coil.

It will be realized that since the laminations generally are of a closed rectangular configuration, having only a single discontinuity as shown at 107, each lamination must be separated or opened at its discontinuity in order to be inserted about the coil or previously inserted laminations. This action is provided by the separator mechanism which is generally indicated at 110. The separator includes a mounting block 111 to which is pivotally attached an arm 112 that carries a number of teeth 113 at its distal end. A second arm 114 is also carried by the block 111. The first arm 112 is biased toward the second arm 114 by a spring 115 mounted between the two arms. An actuator 116 and piston 117 are used to rotate the arm 112 about its pivot against the biasing force of spring 115.

The mounting block 111 and thus the arms 112 and 114 are vertically movable by means of an actuator 118 and piston 119 and are guided in their vertical motion by a guide block arrangement generally indicated at 120. The guide block 120 and actuator 118 are both attached to an upstanding angle arm 121. The angle arm is mounted to a base 122 which is slidably about the pusher 104 and its associated piston 105. The moveable base 122 is connected by a piston 123 to a double acting actuator 124.

Normally the mounting block 11 and arm 112 are raised so that a lamination will fit under the arm 112 and, more particularly, under the teeth 113. When a lamination has been brought into alignment with a coil 83 by the positioner head 100 the actuator 119 lowers the block 111. Block 111 takes arm 112 with it and one or more of the teeth 113 engage the upper edge of the lamination 97. The actuator 116 then is energized and rotates the arm 112 to the position shown in FIG. 17. The teeth 113 open or separate the lamination 97 at its discontinuity 107. The magnets embedded along the guide 102 retain the longer portion 125 of the first leg of the lamination adjacent to guide 102 and the opening formed between portion 125 and the second or shorter portion 128 of the first lamination leg is sufficient to allow the lamination to be inserted about the coil 83 or the coil plus previously inserted laminations.

Thereafter the insert or pusher 104 is moved by actuator 106 and moves the lamination to the right as seen in the FIGS. At the same time the actuator 124 is energized so that the mounting block 111, with the arm 112, also moves to the right at the same speed as the pusher. The pusher 104 and arm 112 move concurrently until the leading end of the leg portion 125 enters the coil 83. At that time actuator 118 is energized to raise the arm 112 and the teeth 113 are removed from their engagement with the lamination. Pusher 104 continues its movement to the right until the lamination is fully inserted about the coil 83.

The mechanism further includes a pair of pivoted arms 130 and 131 which are moved by actuators 132 and 133 respectively. When a lamination has been fully inserted arm 130 is pivoted by actuator 132 and engages outside leg of the lamination, that is the leg opposite the discontinuous leg. This closes the outside leg toward the coil. Thereafter arm 131 is rotated by actuator 133 and engages the lamination at the corner adjacent the short portion of the first leg and thus assures that the short portion and the third leg moves inwardly and reclose the lamination. The rotating arms are shown in their extracted positions in FIGS. 17 and 18 in their closed positions in FIGS. 14–16. The core forming station 82 is received in a plate 134 which is slidably mounted on guide rails 135 by bushings such as 136. The plate 134 is biased so that the coil 83 and inserted laminations are retained in contact with the guide 102. This may be done by any suitable means such as, for instance, by spring loading the plate 134 or by attaching a weight to the plate through a pulley system for biasing the plate toward the guide 102. This assures that the laminations are properly inserted about the coil and cooperates with the arms 130 and 131 to assure proper reclosing of the laminations.

Many electrical apparatus such as transformers require a first core or a core section to be inserted about one side of a coil and a second core or core section to be inserted about another side of the coil. The core forming station 82 may be in the form of a generally round plate which is rotatably mounted in the support plate 143 with mechanical holders such as those shown at 137. Such an arrangement requires a minimum handling of a coil in completely forming all cores or core sections. The guide 102 is made longitudinally movable. To this end, once one core or core section is completely formed the guide 102 is removed from the coil and the holders 137 are released. Thereafter the core forming station is rotated at 180°C, the holders 137 are re-engaged and the guide 102 is reinserted in the coil. Thereafter a second section may be inserted about the coil. This eliminates any necessity for the operator to lift and turn the coil.

As indicated in FIG. 19, the exemplification core is tightly interlocking. To this end the first leg portions 56a' are relatively short and equal in length while the first leg portion 56a" are relatively long and equal in length. The laminations are alternated so that the joints between adjacent laminations are offset. Thus, the laminations are interlocked and do not tend to come apart.

Each first leg portion 56a and its corresponding second leg portion 56b have been made equal in total length to the corresponding third leg 58 in the exemplification. It will be understood that, by appropriate positioning and actuation of the auxiliary stops, other core configurations can be made. For instance, in the event a gap is desired in any lamination, the auxiliary stops would be set so that leg portions 56a and 56b do not equal leg 58. The increase in length from lamination to lamination can be provided in the leg portion 56a so that the joints are in alignment from lamination to lamination. Also, portions 56a and 56b can be made of a longer total length than leg 58 so they overlap. Thus, any number of well known overall core configurations can be made. For example, they may have variable gaps, bridge gaps, butt gaps, or spaced fixed and alternating gaps.

Many times it is desirable to provide a three phase core, that is an integrated core for a three phase transformer. Particularly in such cases, some people may prefer to use L-laminations other than O-laminations. By appropriate control of the forming head, cutter grippers and stops, the present lamination forming machine will make suitable L-shaped laminations. For example, the machine 10 will make L-laminations which will provide a self-locking core. To this end each such lamination includes an intermediate leg corresponding to one of the second pair of legs 57 or 59 in the O-core. Extending generally perpendicularly from the opposite ends of the intermediate legs are a pair of spaced apart legs equal in length to first and second leg portions 56a and 56b respectively. The machine 10 is set to make two such laminations of each size. These mating legs then can be placed together with the legs 56a abutting the legs 56b. By alternating the length of leg 56a between adjacent lamination pairs, the lamination may be assembled into a self-locking core. Obviously, by adjusting the relative length of 56a and 56b various core configurations can be provided as with the O-laminations. It will be understood that with L-laminations, the exemplification machine will not automatically stack the core.

While in accordance with the patent statutes there have been described what at present are considered to be the preferred embodiments of this invention, it will be obvious to those skilled in the art that numerous changes and modifications being made therein without departing from the invention. It is, therefore, aimed in the appended claims to cover all such equivalent varia-

What we claim as new and desire to secure by Letters Patent in the United States is:

1. A machine for making laminations from strip material for magnetic cores formed of a plurality of individual laminations, each of the laminations being generally rectangular and having one discontinuous side; said machine including:
   a. a forming station for forming a section of the strip material into a generally rectangular configuration and severing the formed section from the strip;
   b. a first powered gripper for advancing the strip to said forming station for formation of a first pair of sides of the lamination;
   c. a second powered gripper for advancing the strip to said forming station for formation of a second pair of sides of the lamination;
   d. first stop means for interrupting strip advancing motion of said first gripper, second stop means for interrupting strip advancing motion of said second gripper; and
   e. auxiliary stop means cooperating with said first gripper for providing strip advancing motion of said first gripper less than that allowed by said first stop whereby one of the first pair of lamination sides is provided with two discontinuous portions.

2. A machine as set forth in claim 1, further including adjustment means effective to change the position of said first and second stop means in accordance with the thickness of the section of the strip material used in the last formed lamination.

3. A machine for making laminations from a strip of material for magnetic cores formed of a plurality of individual laminations; each of the laminations being generally rectangular and having one discontinuous side; said machine including:
   a. a forming station for forming a section of strip material into a generally rectangular configuration and severing the formed section from the strip;
   b. gripper means for advancing the strip of material to said forming station;
   c. normal stop means cooperating with said gripper means for formation of first and second pairs of opposed sides of the lamination;
   d. auxiliary stop means cooperating with said gripper means for providing strip advancing motion of said gripper different than that allowed by said normal stop means whereby one side of the lamination is provided with two discontinuous portions.

4. A machine as set forth in claim 3, wherein said auxiliary stop means has multiple selectable settings for varying the relative lengths of the two discontinuous portions.

5. A machine for making laminations from strip material for magnetic cores formed of a plurality of individual laminations each layer of laminations being generally rectangular and including a pair of laminations; each of said laminations being generally rectilinear; said machine including:
   a. a forming station for forming a section of the strip material into a general rectilinear configuration;
   b. a first powered gripper for advancing the strip to said forming station for formation of a pair of opposed sides of each lamination;
   c. a second powered gripper for advancing the strip to said forming station for formation of an intermediate side of each lamination between said pair of opposed sides;
   d. normal stop means for interrupting strip advancing motion of said first gripper and said second gripper;
   e. auxiliary stop means cooperating with said first gripper for determining strip advancing motion of said first gripper to provide each of said pair of opposed sides with a length independent of the other of said pair of opposed sides.

6. A method of making laminations for use in the core of an electromagnetic apparatus, the laminations being formed from a strip of material into a generally rectangular configuration, said method comprising the steps of:
   a. advancing a free end of the strip the length of a first portion of a first leg of the lamination, forming a generally right angle bend in the strip;
   b. advancing the strip the length of a second leg of the lamination, forming a generally right angle bend in the strip;
   c. advancing the strip the length of a third leg of the lamination, forming a generally right angle bend in the strip; and
   d. advancing the strip the length of a fourth leg of the lamination substantially equal to the length of the second leg, forming a generally right angle bend in the strip; and
   e. advancing the strip the length of a second portion of the first leg of the lamination such that the total length of the first and second portions of the first leg is substantially equal to the length of the third leg, severing the formed lamination from the strip whereby there is provided a generally rectangular lamination having only one discontinuity and a butt joint.

7. A method as set forth in claim 6 wherein one of the portions of the first legs is provided with one of two predetermined lengths, the predetermined length being alternated between successive laminations for use in one core.

* * * * *

UNITED STATES PATENT OFFICE
CERTIFICATE OF CORRECTION

Patent No. 3,892,115  Dated July 1, 1975

Inventor(s) Robert D. Mees, Armin F. Mittermaier, Albert F. Wilcox

It is certified that error appears in the above-identified patent and that said Letters Patent are hereby corrected as shown below:

In the specification:

Column 2, line 19, "the", second occurrence, should be capitalized;
Column 7, line 22, "56" should read --56a'--;
Column 7, line 23, "56a" should read --56a"--;
Column 9, line 7, "11" should read --111--;
Column 10, line 6, "180° C" should read --180°--.

Signed and Sealed this sixteenth Day of September 1975

[SEAL]

Attest:

RUTH C. MASON
Attesting Officer

C. MARSHALL DANN
Commissioner of Patents and Trademarks